Jan. 15, 1946.　　　A. J. GRAFMAN　　　2,392,818
DOUBLE SKIN SHEET METAL STRUCTURAL ELEMENT
Filed Nov. 18, 1940　　　2 Sheets-Sheet 1
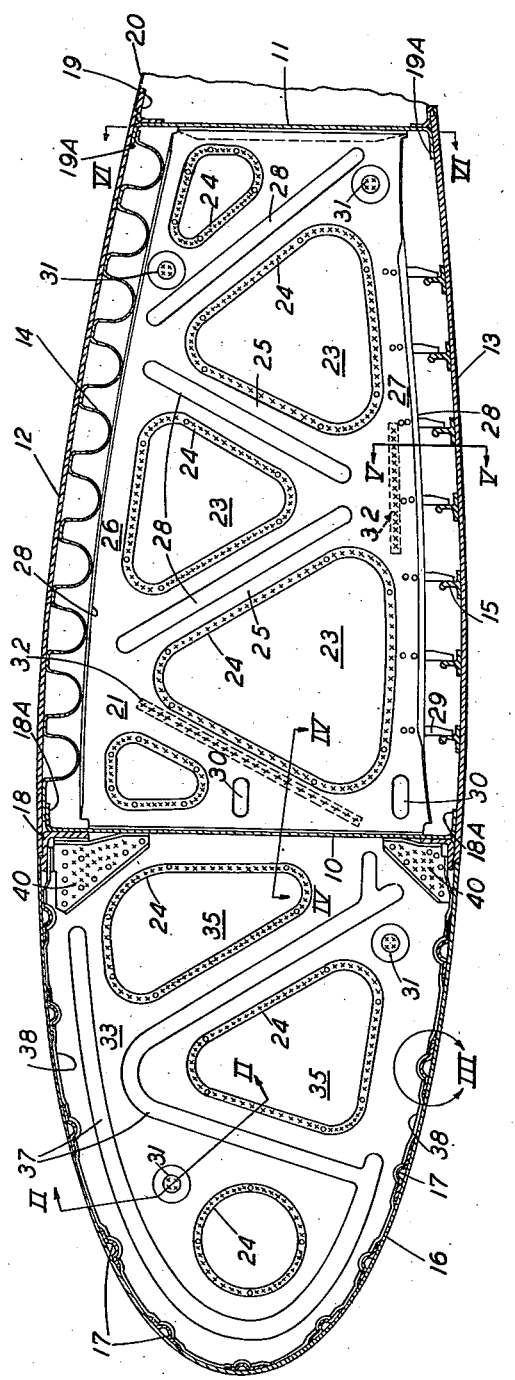
FIG-I
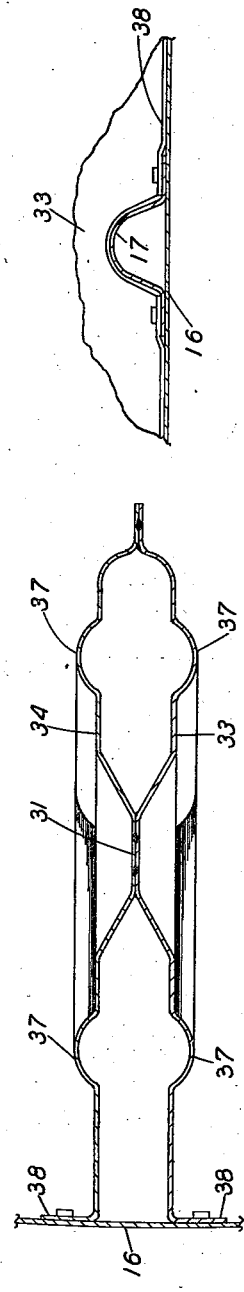
FIG-II
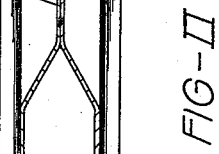
FIG-III
INVENTOR
Abraham Jack Grafman

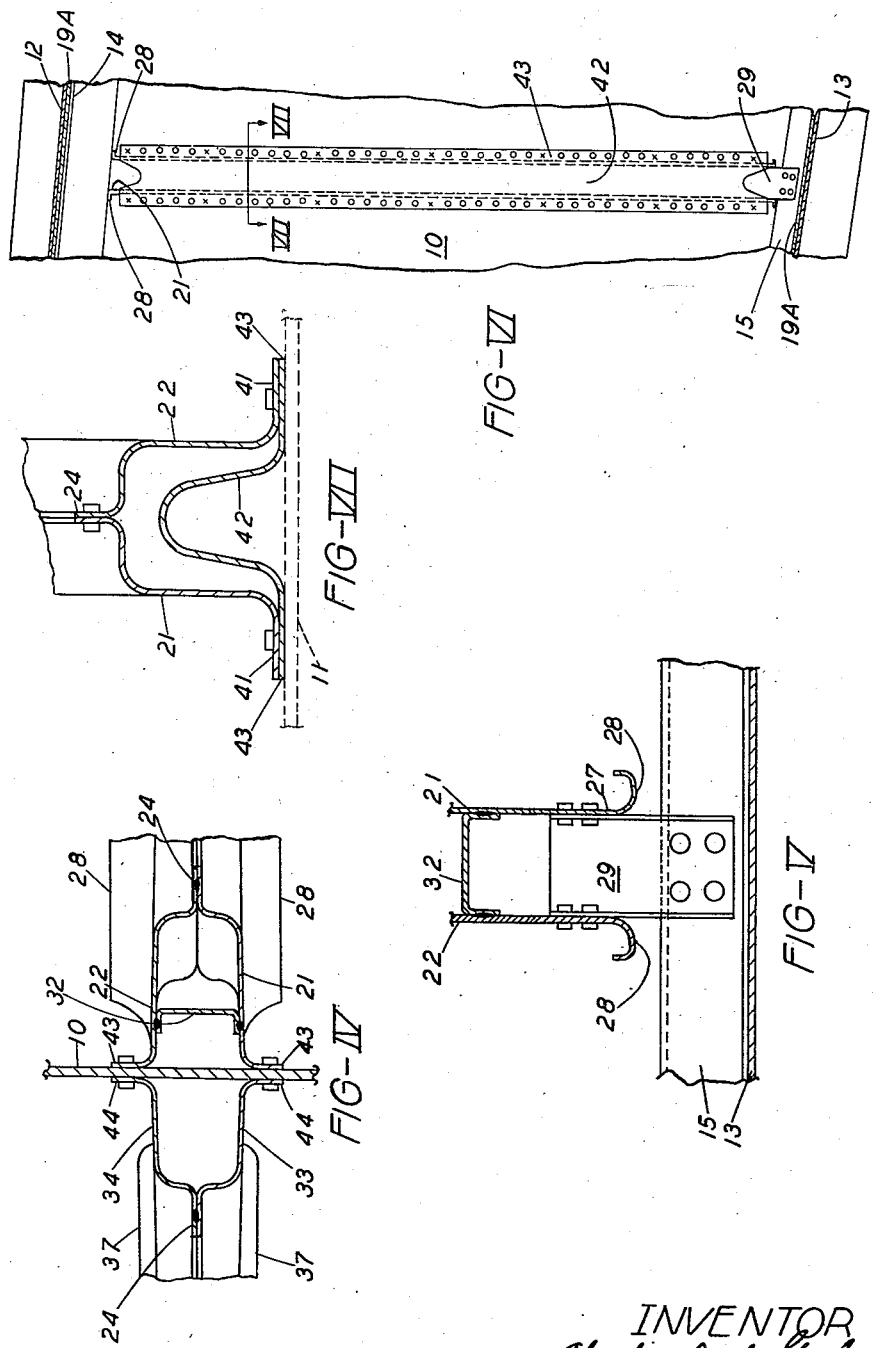

Patented Jan. 15, 1946

2,392,818

UNITED STATES PATENT OFFICE 2,392,818

DOUBLE SKIN SHEET METAL STRUCTURAL ELEMENT

Abraham Jack Grafman, North Hollywood, Calif., assignor to Lockheed Aircraft Corporation, Burbank, Calif.

Application November 18, 1940, Serial No. 366,095

1 Claim. (Cl. 189—37)

This invention relates to an improved and simplified airplane wing rib, or other structural member, particularly adapted for fabrication from simple complementary sheet stampings, by means of spot or roll welding, riveting. or bolting in the case of metal, and cementing in the case of plastic.

It has heretofore been proposed to assemble wing ribs or the like from sheet metal in the form of channels or box sections, but such constructions used straight or uniform sections secured in overlapping or straddling relationship on the principle common to built-up structural beams and columns. Such lap joints add to the weight of the structure, as well as the cost of manufacture and assembly of the resulting unit, as well as the individual struts and beams forming part of the final unit.

It is accordingly an object of this invention to provide an improved and simplified sheet metal structural member for such parts as the ribs of airplanes, wherein a double skin or hollow section is formed from complementary stampings embodying the entire rib structure between longitudinal members such as beams, the two complementary members being assembled along a median line by spot welding and riveting together suitable flanges bounding apertures formed in the members to reduce the flat plate areas of the rib and to lighten the same and to provide an integrally trussed structure comprised by such assembly.

It is an important object of this invention to provide a double web rib or structural member wherein complementary half stampings are assembled together to form spaced webs comprising boundary channels and integral supporting columns or struts of tubular section having a high value for radius of gyration together with few flat areas, thus allowing the structural member to be designed for relatively high and uniform stresses without localized weak points or overlapping joints involving excess material and weight.

It is a further object of this invention to form a rib or structural member of complementary sections which may be formed complete in single operations and assembled along a median line, without the use of expensive jigs or the like, by riveting or otherwise temporarily or permanently fastening abutting flanges together at intervals, such as at changes in curvature of the flanges, and thereafter spot welding together the intervening lengths of flanges between rivet locations; the rivets or other clamping means serving to hold the parts in alignment during the spot welding operation.

It is also an object of this invention to provide an improved and simplified rib construction comprising stamped complementary halves so formed that the webs thereof will be arranged in spaced relationship by means of coacting flanges, the webs being formed with beads and contacting depressions to reduce or eliminate flat plate areas and thus reduce buckling tendencies, the remaining flat plate areas being reinforced if necessary by channel sections inserted between the webs and spot welded, bolted or riveted in place to make the spaced webs work together rather than separately.

It is a further object of this invention to provide an improved and simplified structural element for ribs or the like wherein the spreading or flanging of the supporting surface of the rib adds to the end fixity of the stressed skin structure of the wing, thus allowing the use of higher compression stresses in the wing covering and supporting structure and stiffening said supporting structure thus reducing buckling; and also providing resistance to crushing forces tending to produce deflections and consequent instability of the wing surface.

Other and further important objects of this invention will be apparent from the disclosures in the specification and the accompanying drawings.

This invention is shown on the drawings as embodied in a rib section forming a transverse stiffener for a torsion box type of wing structure, it being understood the invention is not limited to the embodiment chosen for illustrative purposes.

Figure I is a transverse section of a torsion box type of wing construction, including the nose section, but not the trailing edge section; a rib embodying the features of this invention being shown in elevation.

Figure II is a fragmentary section on the line II—II of Figure I showing beaded and depressed areas used to break up large flat plate areas that would otherwise fail to carry stresses easily withstood by the columns or struts supporting the cap strips of the rib.

Figure III is a fragmentary enlarged detail showing one of the hat sections forming longitudinal supports for the skin covering the nose section of the wing.

Figure IV is an enlarged fragmentary section on the line IV—IV of Figure I, taken through the junction of the nose and torsion box sections of the rib with the front shear beam.

Figure V is an enlarged fragmentary section on the line V—V of Figure I, showing the stirrup supporting a longitudinal tension member of the wing, and an interiorly positioned channel adapted to support flat plate areas of the rib webs to prevent buckling thereof.

Figure VI is a vertical section on the line VI—VI, being in effect an end view of the center rib section with the rear shear beam web removed.

Figure VII is an enlarged section on the line VII—VII of Figure VI showing a reinforcement of the beam web nested in the end space or channel of the rib.

Referring to the showing on the drawings, the airplane wing section as a whole comprises nose and center sections separated by a front shear beam 10, a rear shear beam 11 completing a torsion box type of center section wherein upper and lower wing surfaces or skins 12 and 13 are respectively reinforced by a corrugated inner skin 14 and T shaped longitudinals 15; the corrugations 14 and upper skin 12 being designed for compressive loading in a cantilever wing, while the lower skin 13 and the longitudinals 15 are primarily designed for tension loads. The nose section comprises a formed skin 16 supported at intervals by hat section longitudinals 17, the margins of the skin 16 being attached to the forward flanges of angle members 18 secured to the front shear beam, rear flanges 18a of the web 10 supporting the center section skins 12 and 13, which are necessarily of heavier gage to transmit the main loads on the wing. The rear shear beam 11 is similarly formed with angle members 19 and flanges 19a on the web for attachment of the skin 12 and 13, as well as the trailing edge skin 20 as indicated to the rear of the beam 11. It is to be understood that ailerons, and flaps, if the latter are used, are mounted adjacent to or on the rear shear beam 11.

The center section rib, between the two shear beams, comprises two complementary sheet metal webs 21 and 22 which can be formed or stamped out in single pieces and then assembled along their median line to produce a double web rib of the truss type, the diagonal stiffeners of a built-up truss being approximated by providing lightening apertures 23 in the webs which apertures are bounded by flanges 24 lying in the median plane, the remaining web material between the apertures forming diagonal columns or struts 25 of hollow form having their axes intersecting near the upper and lower boundary or cap strips 26 and 27, these columns being longitudinally beaded as indicated at 28 to increase the stiffness thereof. The integral cap strips 26 and 27 formed by the spaced webs 21 and 22 approximate channels in form and the edges of the webs are turned out to form stiffening flanges 28, the whole producing a final section resembling a hat section. It will be noted that the corrugated skin reinforcement 14 rests on the flanges 28 of the upper cap strip 26; while the tension longitudinals 15 are held in spaced relationship to the lower cap strip 27 by channel members 29 riveted or spot welded between the webs and serving to space and stiffen the same against buckling.

Other flat plate areas in the webs can be stiffened by short beads, as at 30; by stamped depressions 31, the bottoms of which lie in the median plane and are spot welded together; or by inserting channel-like reinforcements 32 between the webs as indicated in Figure V. The reinforcing channel 32 is preferable at locations such as the inter-section of the axes of the columns or struts 25, while the short beads or depressed areas spot welded back to back are suitable for other flat plate areas.

The nose section of the rib is similarly formed from complementary sheet metal webs 33 and 34 having lightening apertures 35 defining closed columns or struts 36, a continuous bead 37 being shown as stiffening both the struts and the periphery or integral cap strip of the rib, which is flanged at 38 as before, and is joggled to receive the longitudinals 17, the flanges 38 bearing directly against the nose skin 16. Flat plate areas may be broken up as before, two spot welded depressions 31 being shown.

The center and nose sections of the ribs have the opposed vertical edges of their spaced webs flanged outwardly as at 43 and 44 and secured through the web of the front shear beam 10, as shown in Figure IV, the corners of the nose section being shown as further reinforced by flanged gusset plates 40, which may also be used on the center section if so desired. The rear end of the center rib section is shown in more detail in Figures VI and VII where the spaced webs 21 and 22 have out-turned flanges 41 and embrace a hat section beam web stiffener 42, the flanges 43 of which are secured to the beam web 11 by the rivets or fastenings for the rib flanges 41.

The complementary webs of the nose and center sections of the rib are assembled together by spot welding and riveting the flanges 24 formed around the apertures 23, and are further tied together by the shear beams 10 and 11, depressions 31 and channels 32. Since the individual webs are formed by pressing over forms, or stamping in dies; the accuracy of such forms or dies can be controlled to very close limits so that expensive assembly jigs and hand fitting is not required when joining the complementary sections. Spot welding, without clamps or holding fixtures, is facilitated by the use of roll welding electrodes for straight lines or tangents, as well as open curves. Preliminary assembly is accomplished by rivets or other permanent or temporary fastenings applied at each end of the tangents and at several points in the nose circle, such rivets or fastenings aligning the complementary webs, and preventing distortion or relative slippage under the pressure of the spot welding tips or rolls.

It will be noted that three methods of longitudinal skin supporting structure have been disclosed in the center and nose sections, each having certain advantages while being generally interchangeable. For example, the corrugated inner skin 14 can be used for the nose or tension or lower side if desired and the nose construction shown herein could be used in the center section instead of the spaced rib flanges shown.

While the invention has been illustrated as applied to a rib for a relatively large airplane, it is evident that the principles of this invention are applicable to other structural elements such as wing and floor beams, bulkheads and similar loaded elements that must retain a predetermined profile.

It will thus be seen that I have invented an improved and simplified integrally trussed structure particularly adapted for the fabrication of structural members, including wing ribs for relatively large airplanes, wherein double formed webs are combined in one unit to produce a truss structure having integral columns or struts, reinforced to eliminate large flat plate areas, and particularly adapted for rapid and economical assembly by means of spot roll welding.

It will be evident that this invention is readily embodied in other types of structures than chosen for illustrative purposes herein, and it is to be understood that it is not limited to the specific embodiment disclosed, but contemplates such modifications and variations thereof as come fairly within the spirit of the following claim.

I claim:

A structural element of box section for aerofoils including complementary spaced sheet metal web members having upper flanged peripheries for attachment to longitudinal beams and skin and lower edges bent outwardly and upwardly to provide stiffening means, said web members being formed with integral interior bracing, comprising intersecting beaded columns having inturned marginal portions terminating in mating flanges disposed in the median plane of the spaced web members, inserted reinforcing members positioned between the web members and rigidly secured thereto at an intersection of said columns to stiffen the flat plate area formed by said intersection, means for permanently connecting said web members along the edges of said mating flanges, and strips of channel form secured between the pairs of web members at intervals adjacent the lower edges thereof to serves as means to connect the web members to transverse members of the aerofoil.

ABRAHAM JACK GRAFMAN.